(12) United States Patent
Takimoto et al.

(10) Patent No.: US 7,311,173 B2
(45) Date of Patent: Dec. 25, 2007

(54) REACTION CONTROL SYSTEM FOR OBTAINING PREFERABLE STEERING FEELING

(75) Inventors: Shigenori Takimoto, Utsunomiya (JP); Toshihiro Yoda, Utsunomiya (JP)

(73) Assignee: Honda Motor Co., Ltd, Tokyo (JP)

( * ) Notice: Subject to any disclaimer, the term of this patent is extended or adjusted under 35 U.S.C. 154(b) by 381 days.

(21) Appl. No.: 11/169,428

(22) Filed: Jun. 29, 2005

(65) Prior Publication Data

US 2006/0006021 A1    Jan. 12, 2006

(30) Foreign Application Priority Data

Jul. 12, 2004   (JP)   ............... 2004-204523

(51) Int. Cl.
*B62D 5/04*   (2006.01)
(52) U.S. Cl. ............... 180/446; 180/402; 180/443; 180/444; 701/41; 701/42; 701/43
(58) Field of Classification Search ............... 180/446, 180/444, 443, 402; 701/41, 42, 43
See application file for complete search history.

(56) References Cited

U.S. PATENT DOCUMENTS

| | | | | |
|---|---|---|---|---|
| 5,097,917 | A | * | 3/1992 | Serizawa et al. ............ 180/402 |
| 6,705,424 | B2 | * | 3/2004 | Ogawa et al. ............... 180/446 |
| 6,938,816 | B2 | * | 9/2005 | Tominaga et al. ........... 180/402 |
| 7,174,987 | B2 | * | 2/2007 | Husain ........................ 180/402 |
| 2006/0000663 | A1 | * | 1/2006 | Takimoto et al. ............ 180/446 |

FOREIGN PATENT DOCUMENTS

| | | |
|---|---|---|
| DE | 103 13 387 | 10/2003 |
| GB | 2386880 | 10/2003 |
| JP | 2000-25630 | 1/2000 |

* cited by examiner

*Primary Examiner*—Lesley D. Morris
*Assistant Examiner*—Marlon Arce-Diaz
(74) *Attorney, Agent, or Firm*—Hamre, Schumann, Mueller & Larson, PC

(57) ABSTRACT

A reaction control system controls a reactive force to be applied to an operating device operated by a driver of a vehicle. The system includes a device for measuring a steering speed of steering of the operating device; a device for measuring a steering torque applied to the operating device; and a reactive force correcting device for correcting the reactive force in a manner such that the corrected reactive force increases at least when the measured steering speed is zero, and that the higher the measured steering torque, the higher the corrected reactive force is. The reactive force correcting device may correct the reactive force in a manner such that the higher a speed of the vehicle, the higher the corrected reactive force is. A non-effectivity range of the steering torque in which the corrected reactive force is not influenced by the steering torque may be defined.

6 Claims, 3 Drawing Sheets

REACTION CONTROL SYSTEM FOR OBTAINING PREFERABLE STEERING FEELING

BACKGROUND OF THE INVENTION

1. Field of the Invention

The present invention relates to a reaction control system for controlling a reactive force to be applied to an operating device in a steering system of a vehicle.

Priority is claimed on Japanese Patent Application No. 2004-204523, filed Jul. 12, 2004, the content of which is incorporated herein by reference.

2. Description of Related Art

As a steering system for a vehicle, an electric power steering system is known. In the electric power steering system, a steering shaft coupled to a steering wheel is mechanically coupled to a steering mechanism for steering steered wheels, and an electric motor for assisting steering power is linked to the steering mechanism. In such an electric power steering system, a driving torque command value for the electric motor (i.e., a current value of current for driving the motor) is controlled in a manner such that the greater the steering torque applied to the steering shaft, the greater the assistant steering power is.

In an example system of the electric power steering system, a base driving torque command value is determined according to the steering torque of the steering wheel, and the driving torque command value is determined by subtracting a driving torque correction value, which is determined according to the steering speed of the steering wheel, from the base driving torque command value (see, for example, Japanese Patent No. 3176899). The driving torque correction value indicates a reactive force for the driving torque command value (which is an assistant power component), and functions for applying steering reaction (force) to the steering wheel.

However, in the conventional system in which the driving torque correction value is determined according to the steering speed of the steering wheel, when a steered state is maintained or steering in the opposite direction (i.e., a returning operation) is performed and the steering speed becomes zero, the driving torque correction value indicating the reactive force also becomes zero (i.e., the steering reaction of the steering wheel becomes zero); thus, it is difficult to obtain sufficiently stable feeling for the steering wheel while the steered state is maintained, and hysteresis for returning the steered wheels is low, thereby degrading steering feeling.

SUMMARY OF THE INVENTION

In view of the above circumstances, an object of the present invention is to provide a reaction control system for obtaining a preferable steering feeling when the steered state is maintained or the steered wheel is returned.

Therefore, the present invention provides a reaction control system for controlling a reactive force to be applied to an operating device (e.g., a steering wheel 3 in an embodiment explained below) operated by a driver of a vehicle, the system comprising:

a steering speed measuring device (e.g., a steering speed sensor 15 in the embodiment) for measuring a steering speed of steering of the operating device;

a steering torque measuring device (e.g., a steering torque sensor 16 in the embodiment) for measuring a steering torque applied to the operating device; and a reactive force correcting device (e.g., a secondary reaction correcting section 35 in the embodiment) for correcting the reactive force in a manner such that:

the corrected reactive force increases at least when the steering speed measured by the steering speed measuring device is zero, and the higher the steering torque measured by the steering torque measuring device, the higher the corrected reactive force is.

According to the above structure, basically, the reactive force increases when the steering speed is zero, thereby obtaining (i) a stable feeling for steering when the steered state is maintained, and (ii) higher hysteresis when the steered operating device is returned. In addition, when the steering torque is low (e.g., when lateral acceleration of the vehicle is low), the reactive force applied to the operating device is low, so that assistant steering power by an electric motor can be effectively used when the running state of the vehicle is switched from straight running to turning. Therefore, it is possible to prevent the steering reactive force from decreasing when a steered state is maintained or the steered operating device is returned, thereby improving steering feeling.

Typically, the reactive force correcting device corrects the reactive force in a manner such that the higher a speed of the vehicle, the higher the corrected reactive force is. Accordingly, when the vehicle turns at a low speed, the reactive force applied to the operating device can be low, thereby effectively using assistant steering power by an electric motor. Conversely, when the vehicle turns at a high speed, the reactive force applied to the operating device can be high, thereby improving stable feeling for the vehicle. Therefore, it is possible to further increase the steering feeling.

In a preferable example, in the correction of the reactive force correcting device, a non-effectivity range of the steering torque in which the corrected reactive force is not influenced by the steering torque is defined in a manner such that the lower the speed of the vehicle, the wider the non-effectivity range of the steering torque is.

Accordingly, at a relatively high vehicle speed, the reactive force can be high from when the steering torque is relatively low. At a relatively low vehicle speed, the reactive force can be low until when the steering torque becomes relatively high. Therefore, the reactive force to be applied to the operating device can be more appropriately determined in accordance with the vehicle speed, thereby further increasing the steering feeling.

Preferably, the corrected reactive force is added to a reactive force which is in proportion to the steering speed and is also applied to the operating device. Typically, the corrected reactive force is added when the operating device is returned from a steered state.

BRIEF DESCRIPTION OF THE DRAWINGS

FIGS. 3A and 3B are graphs showing the relationship of a ratio for computing a correction current, with respect to the steering torque, wherein FIG. 3A shows the relationship when the vehicle speed is relatively high, and FIG. 3B shows the relationship when the vehicle speed is relatively low.

DETAILED DESCRIPTION OF THE INVENTION

Figure 1:
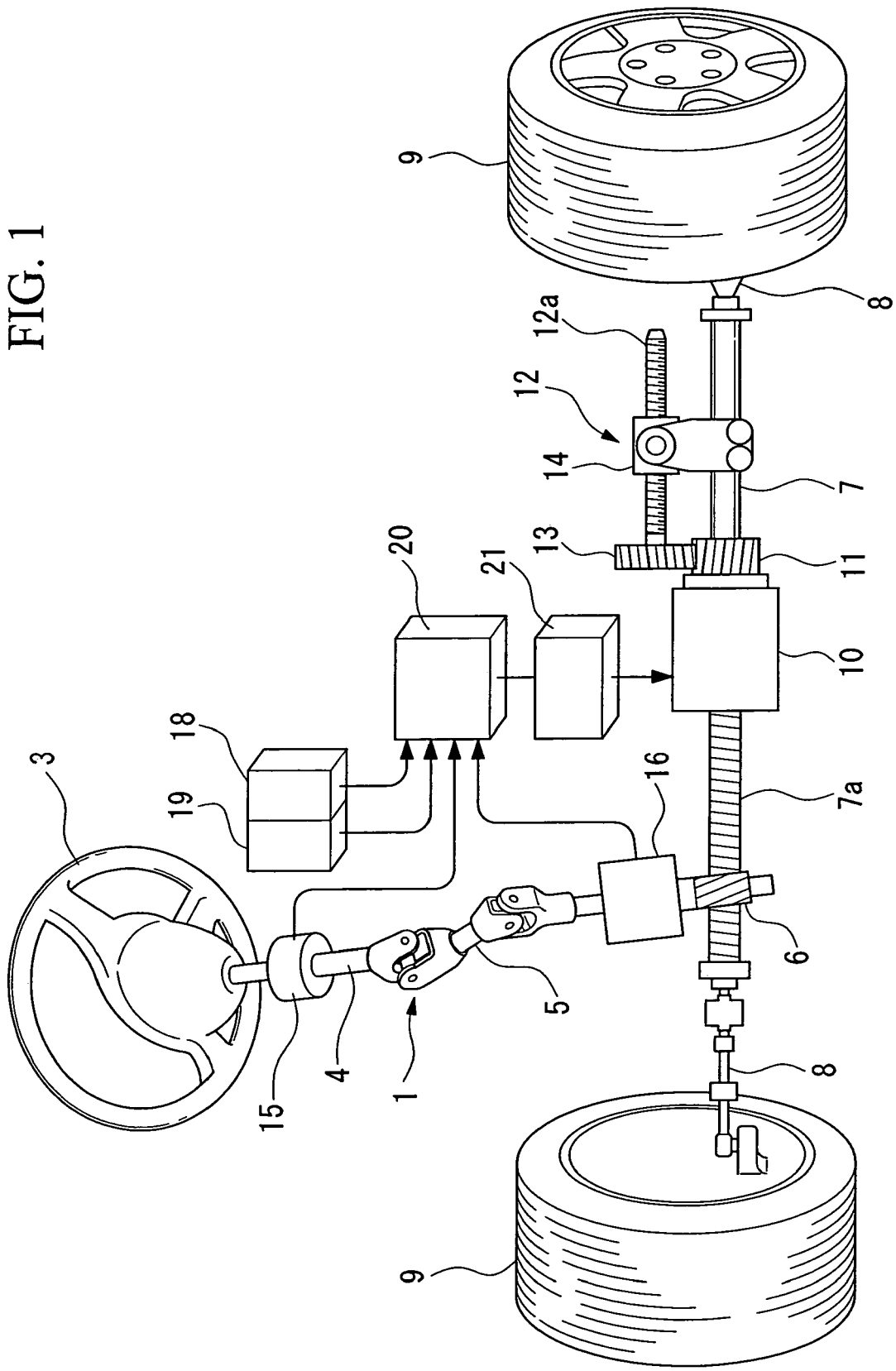
FIG. 1 is a diagram showing the structure of an electric power steering system which employs a reaction control system according to the present invention.
Figure 2:
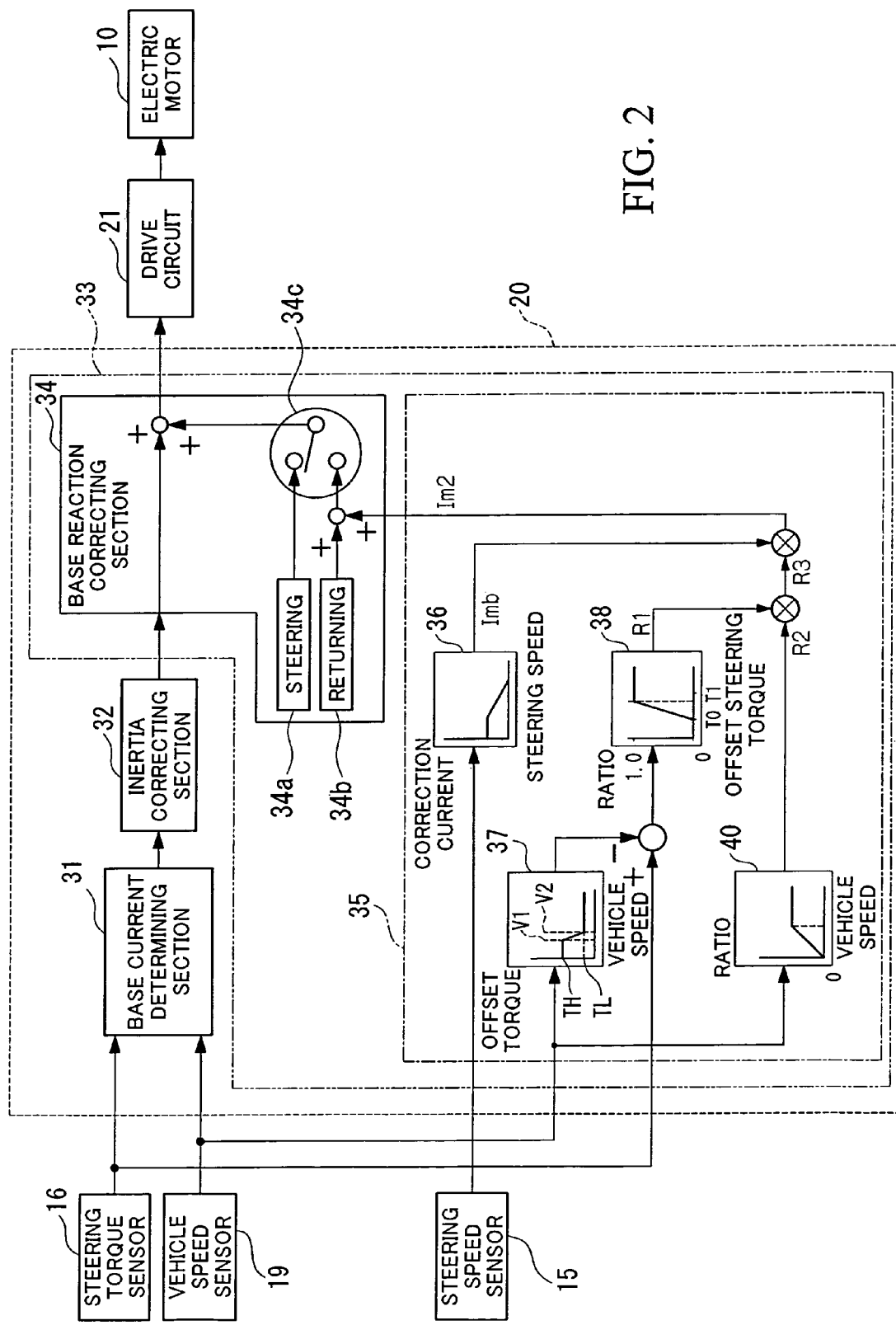
FIG. 2 is a block diagram for control of motor current in the electric power steering system.

Hereinafter, an embodiment of the reaction control system according to the present invention will be explained with reference to FIGS. 1 to 3. In the embodiment, the present invention is applied to an electric power steering system.

First, the structure of the electric power steering system will be explained with reference to FIG. 1. The electric power steering system has a manual steering power generating mechanism 1 in which a steering shaft 4, which is integrally coupled to a steering wheel 3 (i.e., an operating device), is coupled to a pinion 6 of a rack and pinion mechanism by way of a connection shaft 5 which has a universal joint. The pinion 6 is engaged with a rack 7a of a rack shaft 7 which can reciprocate in the axis of the vehicle's width. In addition, front wheels on the vehicle's right and left sides, which are steered wheels, are respectively coupled via tie rods 8 to both ends of the rack shaft 7. According to this structure, normal rack and pinion steering operation can be performed by operating the steering wheel 3, so as to steer the front wheels 9 and turn the vehicle. The rack shaft 7 and the tie rods 8 constitute a steering mechanism.

In addition, an electric motor 10 for providing assistant steering power is provided coaxially to the rack shaft 7. The assistant steering power, by which the steering power to be generated by the manual steering force generating mechanism 1 can be reduced, is converted into thrust by way of a ball screw mechanism 12 which is arranged to be substantially parallel to the rack shaft 7. This thrust acts on the rack shaft 7. Therefore, a driving helical gear 11 is integrally attached to the rotor of the motor 10 into which the rack shaft 7 is inserted, and a driven helical gear 13, which engages with the driving helical gear 11, is provided at an end of a screw shaft 12a of the ball screw mechanism 12. A nut 14 of the ball screw mechanism 12 is fastened to the rack 7.

A steering speed sensor 15 (i.e., a steering speed measuring device) for measuring the steering speed of the steering shaft 4 is attached to the steering shaft 4. A steering torque sensor 16 (i.e., a steering torque measuring device) for measuring the steering torque applied to the pinion 6 is provided in a steering gear box (not shown) which contains the rack and pinion mechanism (which includes the structural elements 6 and 7a). The steering speed sensor 15 outputs an electrical signal corresponding to the measured steering speed to a steering control device 20, and the steering torque sensor 16 outputs an electrical signal corresponding to the measured steering torque to the steering control device 20.

In addition, a yaw rate sensor 18 for measuring the yaw rate of the vehicle (which indicates the behavior of the vehicle) and a vehicle speed sensor 19 for outputting an electrical signal corresponding to the vehicle speed are attached to appropriate positions of the vehicle. The yaw rate sensor 18 outputs an electrical signal corresponding to the measured yaw rate to the steering control device 20, and the vehicle speed sensor 19 outputs an electrical signal corresponding to the measured vehicle speed to the steering control device 20.

The steering control device 20 produces control signals by processing the signals input from the steering speed sensor 15, the steering torque sensor 16, the yaw rate sensor 18, and the vehicle speed sensor 19, and determines a target (electric) current to be supplied to the electric motor 10 based on the control signals. The steering control device 20 supplies the target current to the motor 10 by way of a drive circuit 21, thereby controlling the torque output from the electric motor 10 and controlling the assistant power in the steering operation.

Below, current control for the electric motor 10 in the electric power steering system will be explained with reference to the block diagram in FIG. 2.

The steering control device 20 has a base current determining section 31, an inertia correcting section 32, and a reaction correcting section 33.

In the base current determining section 31, a base current value is determined with reference to a base current table (not shown), based on the signals output from the steering torque sensor 16 and the vehicle speed sensor 19; thus, the base current value is determined according to the steering torque and the vehicle speed. In the base current table, (i) the higher the steering torque, the larger the base current is, and (ii) the higher the vehicle speed, the smaller the base current is.

In the inertia correcting section 32, the base current value determined in the base current determining section 31 is corrected in consideration of the inertial mass of the motor 10.

The reaction correcting section 33 adds a correction current value corresponding to a reactive force to the current value after the correction in consideration of the inertial mass, thereby computing a target current for the electric motor 10. The target current is output to the drive circuit 21. The drive circuit 21 supplies current to the motor while performing control for making the current supplied to the motor 10 approach the target current, thereby controlling the torque output from the motor 10.

Therefore, in the electric power steering system of the present embodiment, the correction current determined in the reaction correcting section 33 corresponds to the reactive force with respect to the operation assistant power, and the base current determined in the base current determining section 31 corresponds to the operation assistant power before the correction or compensation relating to the reactive force.

The reaction correcting section 33 consists of a base reaction correcting section 34 and a secondary reaction correcting section 35 (i.e., a reactive force correction device). The base reaction correcting section 34 includes a steering control amount computing section 34a, a returning control amount computing section 34b, and a switching section 34c.

In the steering control amount computing section 34a, a correction current corresponding to a reactive force when the steering wheel 3 is steered (i.e., initially steered before returning the steering wheel) is computed based on the steering torque and the steering speed of the steering wheel 3. In the returning control amount computing section 34b, a correction current corresponding to a reactive force when the steering wheel 3 is returned is computed based on the steering torque and the steering speed of the steering wheel 3. The correction currents computed in the steering control amount computing section 34a and the returning control amount computing section 34b of the base reaction correcting section 34 are in proportion to the steering speed, and when the steering speed is zero, each correction current is also zero.

The secondary reaction correcting section 35 is connected to the output side of the returning control amount computing section 34b, and a secondary reaction correction current Im2 (explained in detail later) computed in the secondary reaction correcting section 35 is added to the correction current computed by the returning control amount computing section 34b. Here, the steering torque and the steering speed are respectively determined based on the signals output from the steering speed sensor 15 and the steering torque sensor 16. For convenience of illustration, each connection line between the steering control amount computing section 34a or the returning control amount computing section 34b and the steering speed sensor 15 or the steering torque sensor 16 is omitted.

In the switching section 34c, based on a signal output from a determination section (not shown) for determining whether the steering wheel 3 is (initially) steered or returned, one of the steering control amount computing section 34a and the returning control amount computing section 34b is selected. That is, when the steering wheel 3 is steered, the steering control amount computing section 34a is selected, and when the steering wheel 3 is returned, the returning control amount computing section 34b is selected.

Therefore, in the base reaction correcting section 34, a correction current is computed for each state of steering or returning of the steering wheel 3, and the correction current corresponding to the state of the steering wheel 3 is selected by the switching section 34c, so that the selected correction current is added to the current (value) after the correction for the inertial mass.

Computation of the second reaction correction current Im2, performed in the second reaction correcting section 35, will be explained in detail.

First, based on the signal output from the steering speed sensor 15, a correction current Imb is computed with reference to a steering speed table 36. In this steering speed table 36, in a range in which the steering speed is relatively low, the correction current Imb is a large fixed value, and in a steering speed higher than a predetermined value, the correction current Imb gradually decreases according to increase in the steering speed. When the steering speed reaches a predetermined value, the correction current Imb is zero.

In addition, based on the signal output from the vehicle speed sensor 19, an offset torque corresponding to the vehicle speed is computed with reference to an offset table 37. In the offset table 37, in a range in which the vehicle speed V is lower than V1, the offset torque has an upper limit fixed value TH, and in a range in which the vehicle speed V satisfies "V1≦V≦V2", the offset torque gradually decreases according to increase in the vehicle speed. In a range in which the vehicle speed V is higher than V2, the offset torque has a lower limit fixed value TL (TH>TL>0).

The offset torque is subtracted from the steering torque measured by the steering torque sensor 16 so as to obtain a steering torque (called an "offset steering torque" hereinbelow) which is used for computing a ratio. That is, a ratio R1 corresponding to the offset steering torque is computed with reference to a steering torque ratio table 38. Here, if the value obtained by subtracting the offset torque from the steering torque, that is, the offset steering torque, is negative, the offset steering torque is set to zero.

In the steering torque ratio table 38, when the offset steering torque is equal to or less than T0, ratio R1 is zero, and ratio R1 gradually increases according to increase in the offset steering torque. In a range in which the offset steering torque is equal to or greater than a predetermined value T1, the ratio R1 has an upper limit fixed value (e.g., 1.0).

In addition, based on the signal output from the vehicle speed sensor 19, the second reaction correcting section 35 computes a ratio R2 corresponding to the vehicle speed with reference to a vehicle speed ratio table 40. In the vehicle speed ratio table 40, when the vehicle speed is 0, the ratio R2 is also 0. The ratio R2 gradually increases according to increase in the vehicle speed. When the vehicle speed is equal to or higher than a predetermined value, the ratio R2 has an upper limit fixed value (e.g., 1.0).

In the next step, ratio R3 is computed by multiplying the ratio R1 (computed by using the steering torque ratio table 38) by the ratio R2 (computed by using the vehicle speed ratio table 40), that is, R3=R1×R2. The second reaction correction current Im2 is then computed by multiplying the correction current Imb (computed by using the steering speed table 36) by the above ratio R3 (i.e., Im2=Imb×R3). Therefore, correction for the reactive force can be performed using sensors provided in conventional electric power steering systems.

In the base reaction correcting section 34 itself, no reaction is generated when the steering speed is 0; however, such reaction is obtained by employing the second reaction correcting section 35. According to the determination of the second reaction correction current Im2 by the second reaction correcting section 35, the correction for the reactive force based on the steering speed is basically controlled in a manner such that a high reactive force is obtained when the steering speed is low. Therefore, for example, when the steered state is maintained, a stable feeling for steering can be obtained, and when the steering wheel is returned, reaction to the steering action can be obtained. In addition, the ratio R1 which is variable according to the steering torque (i.e., the above-explained offset steering torque) and the ratio R2 which is variable according to the vehicle speed are multiplied together so as to obtain R3, which is further multiplied by the correction current Imb. Therefore, regarding correction under the condition that the steering speed is constant, (i) a higher reactive force is obtained when the steering torque is high in comparison with when the steering torque is low, and (ii) a higher reactive force is obtained when the vehicle speed is high in comparison with when the vehicle speed is low. Accordingly, it is possible that the steering reaction be generated only when a lane is changed or the steering wheel is returned at a high vehicle speed or when a steered state is maintained, and that no steering reaction is generated when the vehicle goes straight in a lane or the steering wheel is returned at a low vehicle speed, thereby improving the feeling to the driver in steering operation. In addition, generally, the higher the vehicle speed is, the more irregular movements of the vehicle happen. Such irregular movements can be reliably suppressed in the present embodiment.

In the above operation, the ratio R1 is computed based on the offset steering torque which is obtained by subtracting the offset torque from the steering torque measured by the steering torque sensor 16. The reason for this process will be explained.

In the steering torque ratio table 38, the ratio R1 is set to 0 in a range in which the offset steering torque is equal to or lower than T0. Therefore, the correction current Im2 (based on the steering speed) corresponding to this range is zero; thus, the above-explained correction relating to the reactive force is not performed, and drive current for driving the electric motor 10 is not influenced by the correction current Im2. That is, in a non-effectivity correction range in which the offset steering torque is equal to or less than T0, the correction current Im2 is set to zero.

Figure 3A:
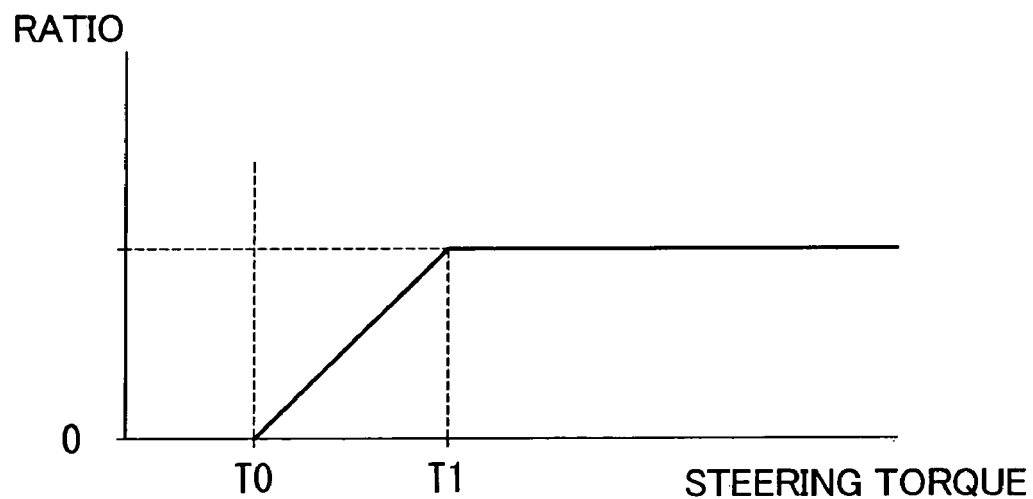
Figure 3B:
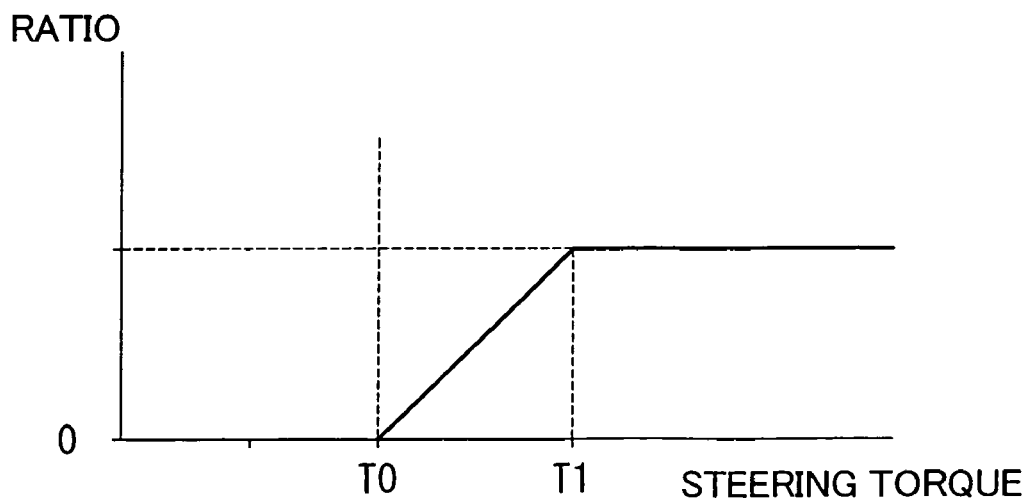

The offset torque is a variable which is set according to the vehicle speed. Therefore, even when the steering torque is the same, the offset steering torque changes according to the vehicle speed. FIGS. 3A and 3B are graphs showing the relationship of the ratio (in the vertical axis) with respect to the steering torque (in the horizontal axis). FIG. 3A shows the relationship when the vehicle speed is relatively high, and FIG. 3B shows the relationship when the vehicle speed is relatively low. As shown by these figures, the non-effectivity correction range can be variable in accordance to the vehicle speed by employing the offset steering torque. Specifically, the non-effectivity correction range for the lower vehicle speed is wider than the non-effectivity correction range for the higher vehicle speed.

Accordingly, at a relatively high vehicle speed, the function of increasing the reactive force based on the steering speed can be effective from when the steering torque is relatively low. At a relatively low vehicle speed, the correction with respect to the reactive force based on the steering speed can be non-effective until when the steering torque becomes relatively high, thereby obtaining maximum assistant power from the electric motor 10. Therefore, for example, the assistant power from the electric motor 10 can be maximized when the steering wheel 3 is returned (i.e., oppositely rotated) while the vehicle is turned at a low speed. With such maximum assistant power, the steering wheel feels light in the driver's hands.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, the reaction control system is not limitedly applied to an electric power steering system but can also be applied to a vehicle steering system employing a SBW (steering by wire) system, an active steering system, or a VGS (variable gear ratio steering) system.

In the SBW system, an operating device and a steering mechanism are mechanically separated from each other, and a reaction motor for applying reaction to the operating device and a steering motor (included in the steering mechanism) for generating power for steering the steered wheels are provided.

In the active steering system, the steered angle of the front wheels and the steered angle of the rear wheels are controlled according to the steering operation of the driver or the driving state of the vehicle.

In the VGS system, the steering gear ratio is variable according to the steering angle.

What is claimed is:

1. A reaction control system for controlling a reactive force to be applied to an operating device operated by a driver of a vehicle, the system comprising:
    a steering speed measuring device for measuring a steering speed of steering of the operating device;
    a steering torque measuring device for measuring a steering torque applied to the operating device; and
    a reactive force correcting device for correcting the reactive force in a manner such that:
    the corrected reactive force increases at least when the steering speed measured by the steering speed measuring device is zero, and
    the higher the steering torque measured by the steering torque measuring device, the higher the corrected reactive force is.

2. The reaction control system as claimed in claim 1, wherein the reactive force correcting device corrects the reactive force in a manner such that the higher a speed of the vehicle, the higher the corrected reactive force is.

3. The reaction control system as claimed in claim 1, wherein in the correction of the reactive force correcting device, a non-effectivity range of the steering torque in which the corrected reactive force is not influenced by the steering torque is defined in a manner such that the lower the speed of the vehicle, the wider the non-effectivity range of the steering torque is.

4. The reaction control system as claimed in claim 2, wherein in the correction of the reactive force correcting device, a non-effectivity range of the steering torque in which the corrected reactive force is not influenced by the steering torque is defined in a manner such that the lower the speed of the vehicle, the wider the non-effectivity range of the steering torque is.

5. The reaction control system as claimed in claim 1, wherein the corrected reactive force is added to a reactive force which is in proportion to the steering speed and is also applied to the operating device.

6. The reaction control system as claimed in claim 5, wherein the corrected reactive force is added when the operating device is returned from a steered state.

* * * * *